June 26, 1945.  K. MILLER  2,379,023

TWO-WAY CLUTCH

Filed Dec. 8, 1941

Inventor:
Kay Miller
By McCanna, Winterson
& Morsbach
Attys.

Patented June 26, 1945

2,379,023

UNITED STATES PATENT OFFICE 2,379,023

TWO-WAY CLUTCH

Kay Miller, Rockford, Ill., assignor to The Atwood Vacuum Machine Company, Rockford, Ill., a copartnership composed of Seth B. Atwood and Janes T. Atwood Application December 8, 1941, Serial No. 422,045

13 Claims. (Cl. 192—48)

This invention relates to friction clutches and is more particularly concerned with a new and improved two-way clutch especially designed for use with a two-rate transmission in a tractor, tank, truck, or the like, but of course is suitable for other uses.

The principal object of my invention is to provide a friction clutch of the kind mentioned, in which a pressure plate is arranged to cooperate selectively with either of two clutch disks, the one driving a shaft associated with one gear train and the other driving a quill surrounding the shaft and associated with the other gear train, whereby when the one disk is engaged the other turns idly with its gear train, and vice versa, the purpose being to enable quick change in the drive ratio by merely shifting the clutch instead of having to shift gears in the transmission.

An important feature of the present invention consists in the provision of spring means cooperating with clutch actuating levers so as to apply spring pressure to the pressure plate in either direction, said spring means affording substantially constant pressure on the pressure plate in either position of clutch engagement and permitting movement past dead center position of the toggle linkage provided in certain forms for operating the actuating levers, whereby the clutch is automatically maintained in either engaged position under spring pressure until moved manually to neutral position or to the other engaged position.

The invention is illustrated in the accompanying drawing, in which—

Figure 1:
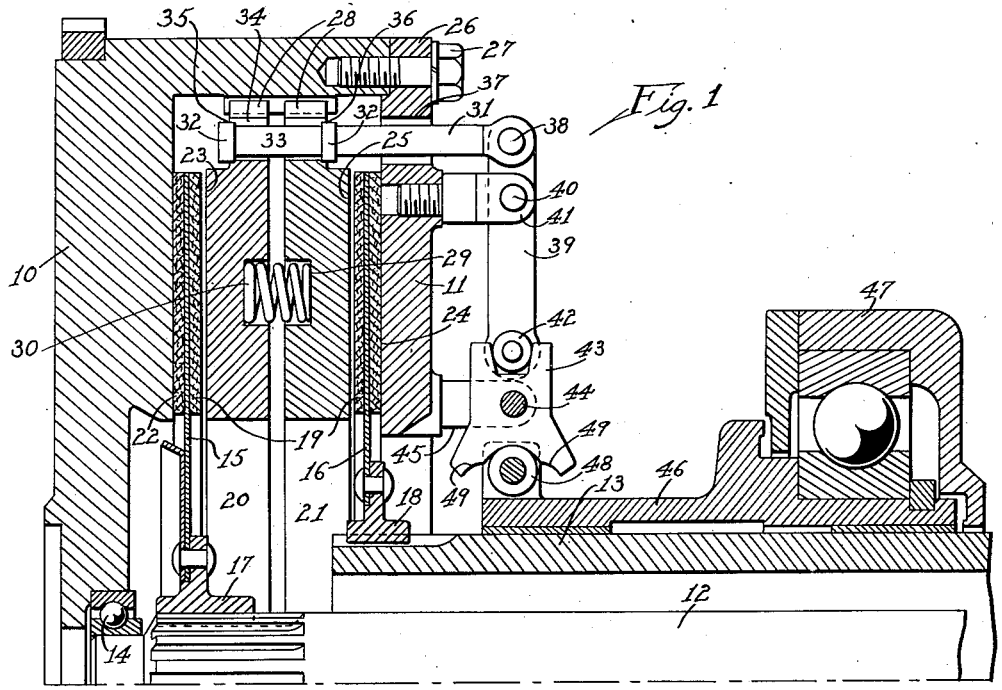
Figure 2:
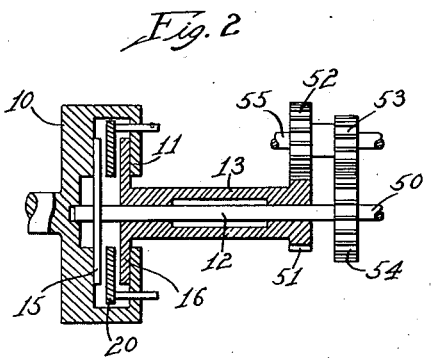

Figure 1 is a longitudinal section through a two-way clutch made in accordance with my invention, half of the complete section being omitted to conserve space and permit showing the parts on a larger scale, and Fig. 2 is a diagrammatic illustration of the two-rate transmission in connection with which the clutch of my invention is employed.

Referring first to Fig. 1, the reference numeral 10 designates the flywheel of an engine, and 11 the back plate thereon. 12 is a driven shaft extending rearwardly from the flywheel adapted for direct connection with the propeller shaft or to be extended into the front end of the gear box of a transmission, and 13 is a quill surrounding the shaft and serving as an auxiliary driven member, the shaft 12 being for high ratio drive and the quill 13 for low ratio drive, as will soon appear. The shaft 12 has the usual pilot bearing 14 supporting the front end thereof at the center of the flywheel 10. 15 and 16 are clutch disks, the disk 15 having its center hub 17 splined on the front end of the shaft 12 to transmit drive from the flywheel to the shaft when the disk 15 is engaged, and the disk 16 having its hub 18 splined on the front end of the quill 13 to transmit drive from the flywheel to the quill when the disk 16 is engaged. At 19 are shown the usual pads or facings on the clutch disks, and at 20—21 is indicated a two-section pressure plate between the two disks, adapted when moved forwardly to engage disk 15 with the driving face 22 on the back of the flywheel and the companion driving face 23 on the front of the pressure plate section 20. The pressure plate is also movable rearwardly for engagement with disk 16 to cause engagement thereof with the driving face 24 on the back plate 11 and the companion driving face 25 on the back of the pressure plate section 21. The pressure plate sections are suitably cast like the flywheel and back plate and the faces 22—25 are accurately machined on these cast parts to insure smooth clutch engagement. The back plate is suitably bolted to the flywheel by means of its marginal flange portion 26, as indicated at 27. The pressure plate sections have sliding driving connections peripherally thereof with the rim portion of the flywheel, as indicated at 28, and have registering recesses 29 provided therein in circumferentially spaced relation for reception of coiled compression springs 30. Posts 31, of which there are preferably six for the clutch in circumferentially spaced relation, have annular shoulders 32 projecting from the inner end portions 33 thereof in longitudinally spaced relation, and these end portions 33 are arranged to be entered in radial notches 34 provided therefor in the periphery of the pressure plate sections when the pressure plate sections are forced together. The shoulders 32 thereafter limit the extent to which the pressure plate sections will be free to move apart, thereby determining the preload compression of the springs 30, while at the same time allowing for further compression of the springs in the engagement of the clutch to secure engagement under increased spring pressure. The annular shoulders 35 and 36 provided on the peripheral portions of the pressure plate sections prevent disengagement of the posts 31 under centrifugal force with the pressure plate in neutral or in either engaged position. The posts 31 project freely through holes 37 provided in the back plate 11 and have pivotal connection, as at 38, with the outer ends of radially disposed elongated clutch actuating levers 39. The levers 39 are pivotally mounted intermediate their ends, as at 40, on forks 41 carried on the back plate. Rollers 42 are mounted on the inner ends of the levers 39 and are received in the outer forked ends of double fork pressure-multiplication lever members 43 pivotally mounted, as at 44, on lugs 45 suitably cast integral with and projecting rearwardly from the back plate. 46 is the throw-out collar reciprocable relative to the quill 13 as by means of the anti-friction shifter ring 47. The latter is usually provided with trunnions for cooperation with a yoke, or other clutch operating means, not shown. Rollers 48 carried on the forward end of the throw-out collar engage in the inner forked ends of the double forked members 43 a distance somewhat farther from the pivots 44 than the rollers 42, whereby to obtain a desired pressure-multiplication in the engagement of the clutch in either direction and have the advantage of a clutch operable with lighter hand or pedal pressure. Depressions 49 in the arms of the forked members 43 have the rollers 48 engaged therein when the throw-out collar has been moved to either extreme position for engagement of the disk 15 or the disk 16. In that way the throw-out collar is held yieldingly in either of these extreme positions and there is avoided the likelihood of the clutch being accidentally disengaged. The forked members hold the pressure plate in neutral position when the throw-out collar 46 is in neutral position.

In operation, the clutch, as previously indicated, is used in conjunction with a two-rate transmission, where the shaft 12, as shown in Fig. 2, extends rearwardly from the clutch and has the rear end portion 50 either directly connected through a universal joint with the propeller shaft of the tractor, truck, tank, or other vehicle, or extended into the front end of the gear box of a change speed transmission providing any desired number of speeds for forward and reverse drive. The quill 13, which provides the low ratio drive, has a gear 51 on the rear end thereof meshing with the larger gear 52 of a two-gear cluster, the smaller gear 53 of which meshes with a large gear 54 on the shaft 12, whereby to drive the shaft 12 at a reduced speed when the disk 16 on the quill 13 is engaged. The cluster 52—53 is supported on a spindle 55 suitably mounted in spaced parallel relation to the shaft 12 and quill 13. Of course, when the disk 15 on the shaft 12 is engaged, the quill 13 and disk 16 are driven idly by reason of the reduction gearing connection with the shaft 12. Forward movement of the throw-out collar 46 by means of a manually operable clutch pedal or lever (not shown) causes engagement of the disk 15. When the throw-out collar 46 is moved rearwardly by means of a manually operable clutch pedal or lever, the disk 16 is engaged. The springs 30, in addition to providing resilient engagement so that close adjustment is not required even though the clutch is of the over-center type, provide substantially constant pressure and accordingly non-slipping engagement regardless of the usual wear on the clutch facings 19. In addition the springs, as previously described, act to hold the throw-out collar 46 resiliently in either extreme position to avoid likelihood of accidental disengagement of the clutch. On the other hand when the throw-out collar 46 is in the neutral position shown in Fig. 1, the forked members 43 hold the pressure plate 21 in the mid-position out of engagement with both disks 15 and 16 so that the likelihood of accidental engagement of the clutch is avoided.

It is believed the foregoing description conveys a good understanding of the objects and advantages of my invention. The appended claims have been drawn to cover all legitimate modifications and adaptations.

I claim:

1. In a friction clutch, the combination of a flywheel constituting the driving element, a back plate therefor, two separate and independent clutch disks constituting the driven elements, means driven by each of said clutch disks, a pressure plate between said disks and comprising relatively axially movable parts, one for engagement with one of said disks when the pressure plate is moved in one direction and the other for engagement with the other of said disks when the pressure plate is moved in the opposite direction, spring means caged between said pressure plate parts in preloaded condition, pressure plate actuating members extending from the pressure plate and guided for limited movement with respect thereto in either direction to engage either of said parts with its associated disk and further compress the aforesaid spring means so that the disk is engaged resiliently under increased spring pressure, and clutch engaging means cooperating with said actuating members for moving the pressure plate, whereby to engage either of said disks and thereafter further compress said spring means.

2. In a friction clutch, the combination of a flywheel constituting the driving element, a back plate therefor, two separate and independent clutch disks constituting driven elements, means driven by each of said clutch disks, a pressure plate between said disks and comprising relatively axially movable parts, one for engagement with one of said disks when the pressure plate is moved in one direction and the other for engagement with the other of said disks when the pressure plate is moved in the opposite direction, spring means caged between said pressure plate parts in preloaded condition, pressure plate actuating members extending from the pressure plate and guided for limited movement with respect thereto in either direction to engage either of said parts with its associated disk and further compress the aforesaid spring means so that the disk is engaged resiliently under increased spring pressure, levers pivoted on the back plate intermediate their ends and connected at their outer ends with said actuating members, a throw-out collar, and intermediate members pivoted on the back plate and operatively connected at one end to the inner end of said levers and operatively connected at the other end to the throw-out collar so that forward movement of the throw-out collar results in forward movement of the pressure plate, and vice versa.

3. A clutch as set forth in claim 2, wherein the last mentioned connection includes a roller mounted on the throw-out collar and rollingly engaged in a fork on the intermediate member, the arms of the fork having recesses provided therein at predetermined points to establish predetermined limit positions of the throw-out collar corresponding to engaged positions of the clutch in which the spring means is compressed above the preload pressure to predetermined pressures.

4. A clutch as set forth in claim 2, including means for limiting movement of the throw-out collar in opposite directions to establish predetermined limit positions of the throw-out collar corresponding to engaged positions of the clutch in which the spring means is compressed above the preload pressure to predetermined pressures.

5. In a friction clutch, the combination of a flywheel constituting the driving element, a back plate therefor, two separate and independent clutch disks constituting the driven elements, means driven by each of said clutch disks, a pressure plate between said disks for engagement with one of said disks when the pressure plate is moved in one direction and for engagement with the other of said disks when the pressure plate is moved in the opposite direction, pressure plate actuating members extending from the pressure plate, levers pivoted on the back plate intermediate their ends but closer to their outer ends and connected at their outer ends with said actuating members, a throw-out collar, and intermediate pressure-multiplication members pivoted nearer one end on the back plate and operatively connected at the short end to the inner end of said levers and operatively connected at the long end to the throw-out collar so that a given forward movement of the throw-out collar results in a shorter forward movement of the pressure plate, and vice versa.

6. In a friction clutch, the combination of a flywheel constituting the driving element, a back plate therefor, two separate and independent clutch disks constituting the driven elements, means driven by each of said clutch disks, a pressure plate between said disks and comprising relatively axially movable parts, one for engagement with one of said disks when the pressure plate is moved in one direction and the other for engagement with the other of said disks when the pressure plate is moved in the opposite direction, spring means caged between said pressure plate parts in preloaded condition, pressure plate actuating members extending from the pressure plate and guided for limited movement with respect thereto in either direction to engage either of said parts with its associated disk and further compress the aforesaid spring means so that the disk is engaged resiliently under increased spring pressure, levers pivoted on the back plate intermediate their ends but closer to their outer ends and connected at their outer ends with said actuating members, a throw-out collar, and intermediate pressure-multiplication lever members pivoted nearer one end on the back plate and operatively connected at the short end to the inner end of said levers and operatively connected at the long end to the throw-out collar so that a given forward movement of the throw-out collar results in a shorter forward movement of the pressure plate, and vice versa.

7. In a friction clutch, the combination of a flywheel constituting the driving element, a back plate therefor, two separate and independent clutch disks constituting the driven elements, means driven by each of said clutch disks, a pressure plate between said disks and comprising relatively axially movable parts, one for engagement with one of said disks when the pressure plate is moved in one direction and the other for engagement with the other of said disks when the pressure plate is moved in the opposite direction, spring means normally urging said pressure plate parts apart, whereby the clutch is adapted to be engaged resiliently upon engagement of said pressure plate with either disk, means connecting said pressure plate parts limiting the separation thereof to the extent that the pressure plate is capable of engaging only one of said disks at a time, and means for moving the pressure plate to either engaged position.

8. In a friction clutch, the combination of a flywheel constituting the driving element, a back plate therefor, two separate and independent clutch disks constituting the driven elements, means driven by each of said clutch disks, a pressure plate between said disks and comprising relatively axially movable parts, one for engagement with one of said disks when the pressure plate is moved in one direction and the other for engagement with the other of said disks when the pressure plate is moved in the opposite direction, spring means normally urging said pressure plate parts apart, whereby the clutch is adapted to be engaged resiliently upon engagement of said pressure plate with either disk, means connecting said pressure plate parts limiting the separation thereof to the extent that the pressure plate is capable of engaging only one of said disks at a time, a throw-out member movable toward and away from the back plate, and positive acting lever means operatively connected with said pressure plate and operable by said throw-out member to engage the clutch in either direction.

9. In a friction clutch, the combination of a flywheel constituting the driving element, a back plate therefor, two separate and independent clutch disks constituting the driven elements, means driven by each of said clutch disks, a pressure plate between said disks and comprising relatively axially movable parts, one for engagement with one of said disks when the pressure plate is moved in one direction and the other for engagement with the other of said disks when the pressure plate is moved in the opposite direction, preloaded spring means normally urging said pressure plate parts apart, whereby the clutch is adapted to be engaged resiliently under increased spring pressure upon engagement of said pressure plate with either disk, means connecting said pressure plate parts limiting the separation thereof to the extent that the pressure plate is capable of engaging only one of said disks at a time, and means for moving the pressure plate to either engaged position.

10. In a friction clutch, the combination of a flywheel constituting the driving element, a back plate therefor, two separate and independent clutch disks constituting the driven elements, means driven by each of said clutch disks, a pressure plate between said disks and comprising relatively axially movable parts, one for engagement with one of said disks when the pressure plate is moved in one direction and the other for engagement with the other of said disks when the pressure plate is moved in the opposite direction, spring means normally urging said pressure plate parts apart, whereby the clutch is adapted to be engaged resiliently under spring pressure upon engagement of said pressure plate with either disk, means connecting said pressure plate parts limiting the separation thereof to the extent that the pressure plate is capable of engaging only one of said disks at a time, a throw-out member movable from a neutral position toward or away from the back plate to either of two extreme positions for engagement of the clutch, positive acting lever means operatively connected with said pressure plate and operable by said throw-out member to engage the clutch in either direction, and means for releasably locking the lever means in either of its two extreme positions holding the clutch in engaged condition.

11. In a friction clutch, the combination of a flywheel constituting the driving element, a back plate therefor, two separate and independent clutch disks constituting the driven elements, means driven by each of said clutch disks, a pressure plate between said disks for engagement with one of said disks when the pressure plate is moved in one direction and for engagement with the other of said disks when the pressure plate is moved in the opposite direction, pressure plate actuating members extending from the pressure plate, levers pivoted on the back plate intermediate their ends but closer to their outer ends and connected at their outer ends with said actuating members, a single spring means subjected to deflection in the engagement of the pressure plate with either disk, whereby the clutch is engaged resiliently under substantially the same spring pressure in either position, a throw-out member movable toward and away from the back plate, and means operatively connected with the inner ends of the aforesaid levers and operable by said throw-out member to move the pressure plate in either direction to engaged position.

12. In a friction clutch, the combination of a flywheel constituting the driving element, a back plate therefor, two separate and independent clutch disks constituting the driven elements, means driven by each of said clutch disks, a pressure plate between said disks for engagement with one of said disks when the pressure plate is moved in one direction and for engagement with the other of said disks when the pressure plate is moved in the opposite direction, pressure plate actuating members extending from the pressure plate, levers pivoted on the back plate intermediate their ends but closer to their outer ends and connected at their outer ends with said actuating members, a single spring means subjected to deflection in the engagement of the pressure plate with either disk, whereby the clutch is engaged resiliently under substantially the same spring pressure in either position, a throw-out member movable from a neutral position toward or away from the back plate to either of two extreme positions for engagement of the clutch, means operatively connected with the inner ends of the aforesaid levers and operable by said throw-out member to move the pressure plate in either direction to engaged position, and means for releasably locking the last mentioned means in either of its two extreme positions holding the clutch in engaged condition.

13. In a friction clutch, the combination of a flywheel constituting the driving element, a back plate therefor, two separate and independent clutch disks constituting the driven elements, means driven by each of said clutch disks, a pressure plate between said disks and comprising relatively axially movable parts, one for engagement with one of said disks when the pressure plate is moved in one direction and the other for engagement with the other of said disks when the pressure plate is moved in the opposite direction, pressure plate actuating members extending from the pressure plate and guided for limited movement with respect thereto in either direction to engage either of said parts with its associated disk, spring means holding said pressure plate parts apart, whereby the clutch is adapted to be engaged resiliently upon engagement of said pressure plate with either disk, levers pivoted on the back plate intermediate their ends but closer to their outer ends and connected at their outer ends with said actuating members, a throw-out collar, and intermediate pressure-multiplication lever members pivoted nearer one end on the back plate and operatively connected at the short end to the inner end of said first levers and operatively connected at the long end to the throw-out collar so that a given forward movement of the throw-out collar results in a shorter forward movement of the pressure plate, and vice versa.

KAY MILLER.